United States Patent
McClelland et al.

(10) Patent No.: US 6,671,823 B1
(45) Date of Patent: Dec. 30, 2003

(54) ULTRA RELIABLE DISK MEMORY FOR MULTI-PROCESSOR PLATFORMS

(75) Inventors: Hal A. McClelland, Warrenville, IL (US); Gary Joseph Zabinski, Downers Grove, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 572 days.

(21) Appl. No.: 09/616,292

(22) Filed: Jul. 14, 2000

(51) Int. Cl.7 .............................................. G06F 11/00
(52) U.S. Cl. ............................................. 714/13; 714/6
(58) Field of Search ................................. 714/13, 10, 6, 714/5, 15, 16, 20; 711/162; 712/14

(56) References Cited

U.S. PATENT DOCUMENTS

| 5,761,403 | A | * | 6/1998 | Yamagishi | 714/13 |
| 5,933,653 | A | * | 8/1999 | Ofek | 710/6 |
| 6,035,415 | A | * | 3/2000 | Fleming | 714/11 |
| 6,035,417 | A | * | 3/2000 | Kanazawa | 714/13 |
| 6,286,110 | B1 | * | 9/2001 | Klein et al. | 714/2 |

* cited by examiner

Primary Examiner—Robert Beausoliel
Assistant Examiner—Christopher McCarthy

(57) ABSTRACT

In a multi-processor data processing system, apparatus and a method for ensuring continued operation without loss of critical data. The critical disk data of a processor is duplicated on duplex disks of a separate disk platform. The updating of the disk platform information is accomplished automatically so that it is transparent to a user or programmer of the processor. Advantageously, the three-way mirroring of the data (processor disk and two disk platform disks), provides very high reliability.

10 Claims, 4 Drawing Sheets

US 6,671,823 B1

ULTRA RELIABLE DISK MEMORY FOR MULTI-PROCESSOR PLATFORMS

RELATED APPLICATION

This application is related to an application entitled "Ultra-Reliable Disk Memory For Duplex Processor Platforms", Ser. No. 09/616,291, by the inventors of this application and assigned to the same assignee as this application.

PROBLEM

In modern data processing or control systems, including telecommunications systems, a disk memory or its equivalent is used for storing information that is currently not being actively processed, but that can be fetched as needed to perform processing. Some of the information that is kept in disk memories is very valuable, in the sense that the loss associated with a loss of this memory is large. One example of this kind of information, is the billing records of a telecommunication system. If these billing records are lost, the revenue associated with the calls whose billing records have been accumulated in the disk is lost. Such loss can be in the tens and even hundreds of thousands of dollars in a large switching system. Accordingly, systems which use disk memory for such purposes require some form of back-up.

A common arrangement has two processors interconnected by a pair of SCSI buses, each SCSI (Small Computer System Interface) bus also passing through a disk platform for providing duplicate disk storage. A problem with this arrangement is that a failure of the SCSI bus may cause both processors to fail. Another problem is that if this arrangement is used to provide multiple copies of disk data, a heavy processing penalty is incurred in the main processors.

Another solution is to provide periodic back-up of the data in the disk by transmitting this data to some other processing system for storage on tape or other mass memory. Typically, this back-up procedure uses a great deal of processing time, and is therefore, performed only once a day during periods of very light load.

In view of the above, a problem of the prior art is that there is no really satisfactory arrangement for providing for ultra reliable storage of disk information in a multi-processor system.

SOLUTION

The above problem is solved and an advance is made over the prior art in accordance with this invention, wherein each processor platform, comprising a processor and its own simplex or duplex disk memory, is connected to one or more separate disk platforms, each comprising duplicate disk drives; each disk platform is connected to two or more processor platforms. Advantageously, such an arrangement provides a separate platform, having its own power rectification equipment for redundant disk memories which greatly enhances the reliability of the system. The system will only fail if either the disk platform fails and the active processor fails, or if one processor platform and both disk drives of the disk drive platform fail, or if two or more processor platforms fail.

In accordance with one preferred implementation of Applicants' invention, the presence of the disk platform is transparent to the individual processes running on each processor, so that information which is sent to the disk of a platform is automatically also sent to both disk drives of the disk platform. Advantageously, no additional processing time is required to update information in the disk platform.

In accordance with one preferred implementation of Applicants' invention, duplex disk drives are provided on the disk platforms. Advantageously, this greatly increases the reliability of the systems in which the weakest link is usually the disk drive.

In accordance with one feature of Applicants' invention, when all of the disk drive(s) of a processor platform fail, the processor automatically uses the information stored in the disk drives of the disk drive platform. This operation is transparent to the individual processes running on the processor, since disk access software automatically steers a disk read or write request to a working disk drive whether that disk drive is part of the processor platform or a part of the disk drive platform.

BRIEF DESCRIPTION OF THE DRAWING(S)

DETAILED DESCRIPTION

Figure 1:
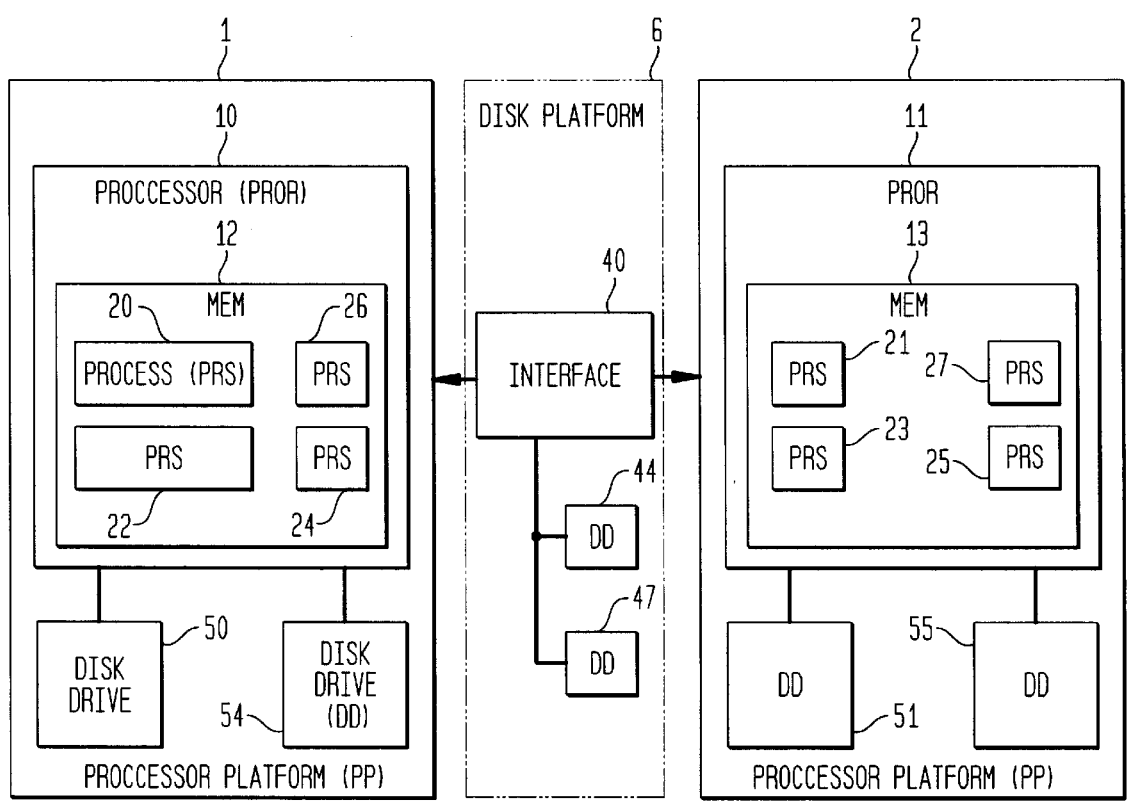
FIG. 1 shows a simple duplex processor arrangement for utilizing a disk platform in accordance with Applicants' invention.

FIG. 1 is a block diagram of a simple duplex processor arrangement for utilizing Applicants' invention. (In case the power supply of the processor and the processor itself are ultra reliable, it may not be necessary to duplicate the processor platforms). Processor platform 1 includes a processor (PROR 10), which contains a memory 12, which has data and software for processes 20, 22, 24, and 26. The processor also includes disk drives 50 and 54.

In this preferred embodiment, critical data is stored in disk 54 and non-critical data in disk 50. For example, disk 50 may contain the operating system which can be retrieved from a connected Operations Support System (not shown). Disk 54 may contain billing records being processed; these billing records may not be duplicated except on other disks of the system. Note that in other configurations, usually having larger disks, disks 50 and 54 may contain duplicate information. The other processor platform 2 contains its own processor 11, its own disk drives 51 and 55, and has processes 21, 23, 25, and 27 stored in its memory 13. In this description, odd and even processes are the two copies of the same process and normally only one of the processes is active. In this configuration, if an active/stand-by processor platform arrangement is used, then processes 20, 22, 24, and 26 are active, and processes 21, 23, 25, and 27 are stand-by. The stand-by processes are ready to become active and are initialized using disk data stored in disk platform 6. If processor platforms 1 and 2 operate in the load-sharing mode, then, as one example, processes 20, 22, 25, and 27 may be active, while processes 21, 23, 24, and 26 are stand-by. In that configuration, both processor platforms are performing processing operations on active processes.

Disk platform 6 contains an interface 40, which communicates with processor platforms 1 and 2. In Applicants' specific implementation, the interface 40 is the controller for a redundant array of inexpensive disks (RAID), a unit that is commercially available. The disk platform is connected to the two processor platforms by SCSI (Small Computer System Interface) buses connected from two ports of the RAID unit to the two processor platforms. Whenever either of the processor platforms writes into its own high reliability information disk, e.g., disk 54, it also sends the information to the disk platform where the RAID causes the information to be written into disk drives 42 and 44. Thus, disks 42 and 44 mirror the information in disk 54, thus creating a three-way mirroring of the information. When a process switches from being stand-by to being active, then its processor reads all disk information for that process from the disk drives of the disk drive platform; as time becomes available, the system consisting of the processor platform and disk platform stores such information into the disk drives of the processor platform containing the process that has been activated from the stand-by state, and can then read from its own disk. If a process is created in one of the processors, then information for the newly created process is stored in the disk drives of the processor platform in which the process was created and is also written into the disk drives of the disk platform.

A process may become active in a load-sharing environment when the other processor platform is overloaded. During the transition, the newly active process reads data from the disk platform. After all data pertaining to the process has been copied into the disk of the processor platform in which the process is now active, the data can be read from the disk of the processor platform.

To maximize reliability, the disk platform has a different source of power than each processor platform.

Figure 2:
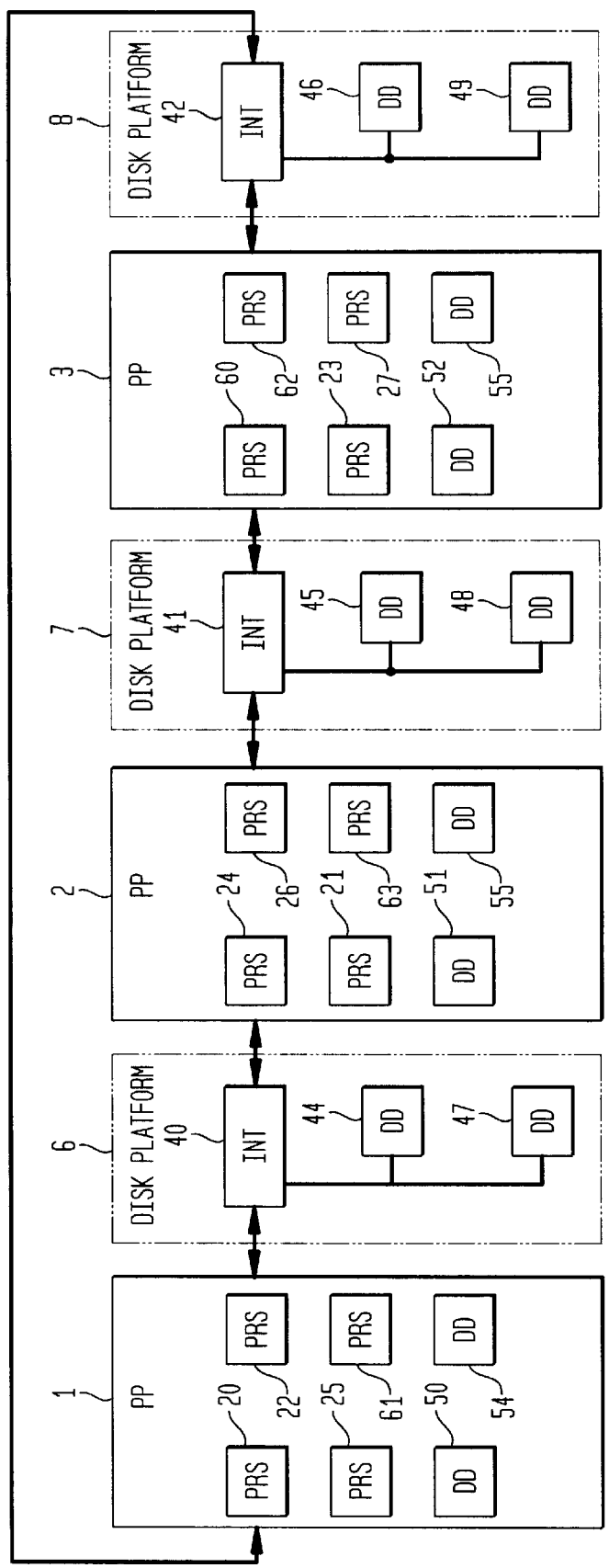
FIG. 2 shows a typical multi-processor arrangement for utilizing Applicants' invention.

FIG. 2 shows a multi-processor arrangement, including three processor platforms (1, 2, and 3) and 3 disk platforms (6, 7, and 8), the disk platforms having interfaces 40, 41, and 42, respectively, and disk drives 44, 47; 45, 48; and 46, 49, respectively. In the particular configuration of FIG. 2, each of the processor platforms is operating in a load-sharing arrangement. Processor platform 1, which has disks 50, 54, serves active processes 20 and 22, and contains stand-by processes 25 and 61, which processes will take over in case of failure of the platform serving processes 24 and 60, respectively. Processor platform 2, which has disks 51, 55, serves active processes 24 and 26, and contains stand-by processes 21 and 63, which processes are ready to take over in case the processor platform of process 20 or 62, respectively, fails. Processor 3, which has disks 52, 56, contains active processes 60 and 62, and stand-by processes 23 and 27, which are ready to take over for processes 22 and 26, respectively, if their serving processor platform fails. It is possible, of course, that each processor platform sends all information to both of the disk platforms to which it is connected. If this type of arrangement creates a possible overload on disk space, an alternative arrangement is to have each processor platform send information to, and read information from, the disk platform which is also connected to the processor platform that contains the stand-by version of the process performing the reading or writing information. For example, processor platform 1 can send information related to process 20 to disk platform 6, the disk platform that is also connected to processor platform 2, which contains the stand-by process 21 that corresponds to process 20. Similarly, processor platform 1 can send information related to process 22 to disk platform 8, which is also connected to processor platform 3 that contains the stand-by process 23 corresponding to process 22. A requirement is that the stand-by process be able to access an up-to-date disk platform, i.e., a disk platform which contains all information that has been recorded by the active process.

In alternative configurations, especially those required for serving a larger number of processor platforms, more than two processor platforms can have access to a disk platform. In one possible configuration, two disk platforms exist, (for added reliability), and all of the processor platforms access both disk platforms. This is a good configuration for cases in which the capacity of the disk drives in the disk platform is high. This configuration also requires that the RAID unit be equipped with more than two SCSI (or equivalent) ports.

Figure 3:
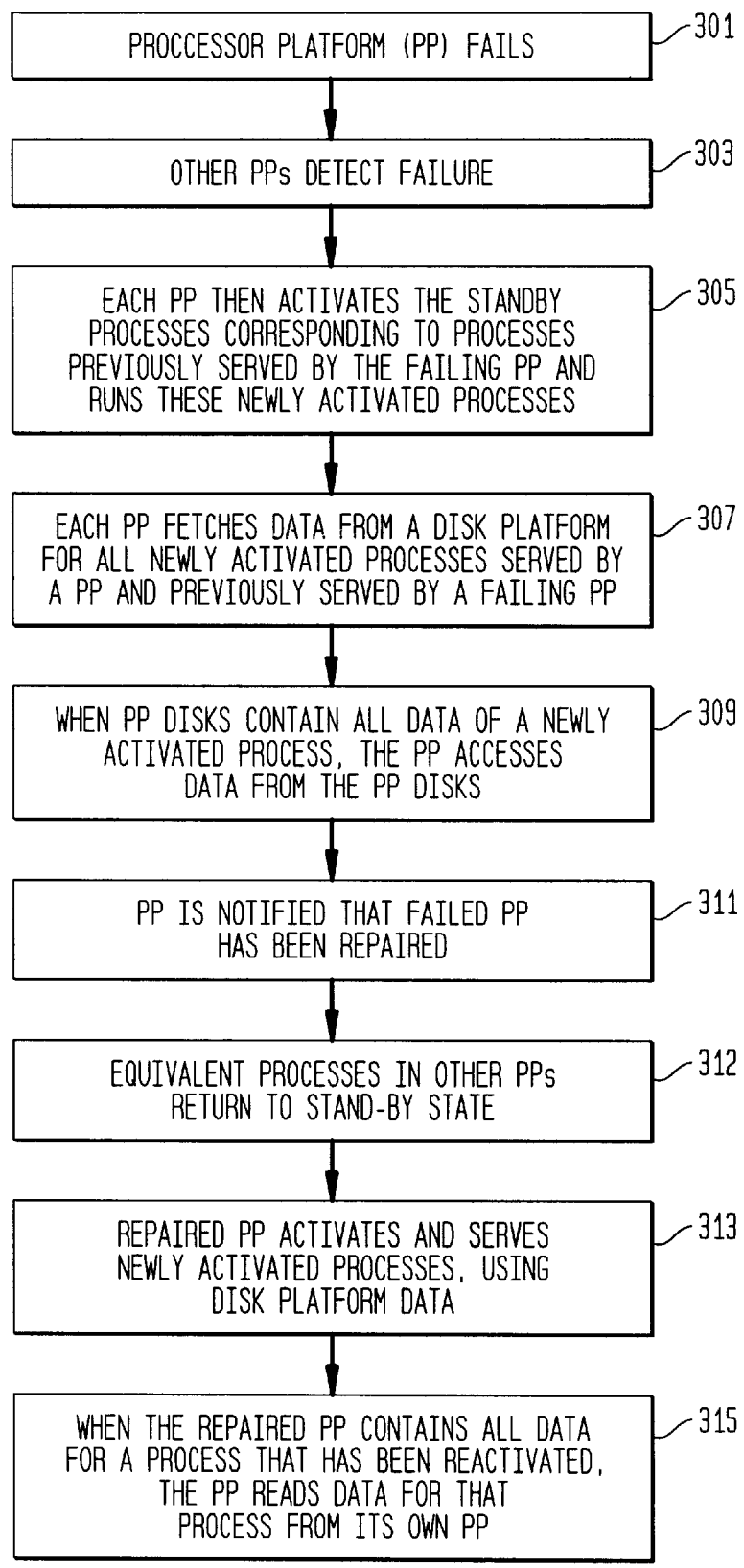
FIG. 3 is a flow diagram illustrating actions performed when a processor platform fails.

FIG. 3 is a flow diagram illustrating the operation of Applicants' invention. The flow starts when a processor platform failure is detected, (Action Block 301). This can be detected, for example, through failure to detect a "heartbeat" signal, or a through process timeouts. This failure is detected in other processor platforms of the system, (Action Block 303). Each processor platform then activates the stand-by processes corresponding to active processes in the failed processor platform and runs the newly active processes using data from the disk platform, (Action Block 305). The fetched data is then stored in internal processor platform disks of each processor platform, (Action Block 307). The processor platform also copies other data for newly-activated processes from the disk platform into the disk of the processor platform; when all data for the process has been copied, the processor platform uses its own disk for that process, but continues to update the disk platform disks, (Action Block 309).

Sometime later, the processor platforms are notified that the failed processor platform has been repaired, (Action Block 311). The equivalent processes in the other processor platforms are returned to the stand-by state, (Action Block 312). The repaired processor platform then serves its newly activated processes using data from the disk platform, (Action Block 313). When all data for a newly activated process has been copied into the serving PP's disk, that PP will access data for that process from its own disk, (Action Block 315).

Figure 4:
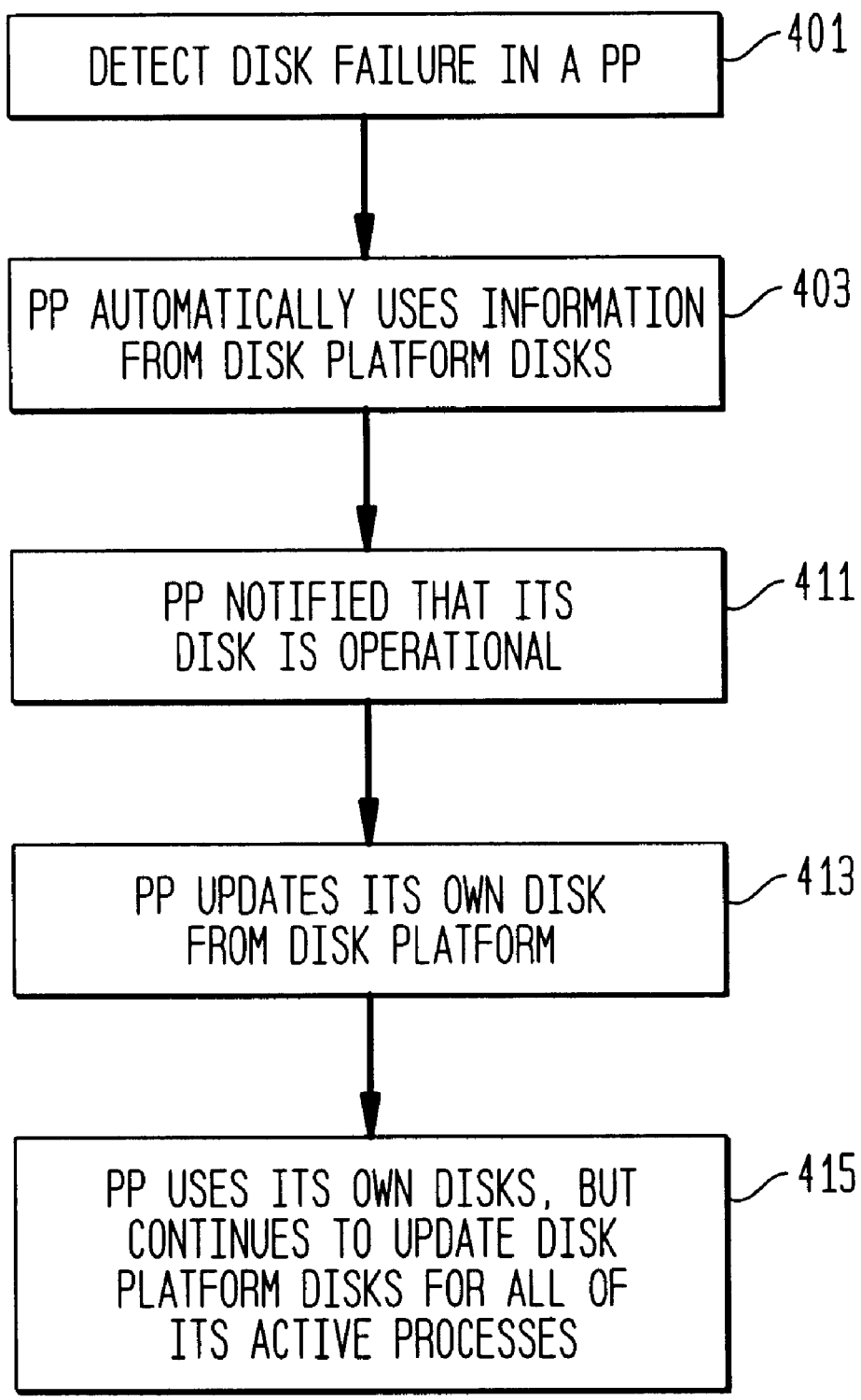
FIG. 4 is a flow diagram illustrating operations performed when the disks of a processor platform fail.

FIG. 4 illustrates what happens in case of a disk failure in a processor platform. The disk failure is detected, (Action Block 401). The processor platform automatically uses information from the disk platform disks, (Action Block 403).

Sometime later, a processor platform is notified that its disks are operational, (Action Block 411). Over time, the processor platform updates its own disks from the disk platform, using the disk platform prior to the completion of the update, (Action Block 413). Thereafter, the processor platform uses its own disks, but continues to update the disk platform disks, (Action Block 415).

The above description is of one preferred embodiment of Applicants' invention. Other embodiments which do not depart from the scope of this invention will be apparent to those of ordinary skill in the art. This invention is limited only by the attached Claims.

What is claimed is:

1. A multi-processor system comprising:
   at least three processor platforms; and
   at least one disk platform;
   each of said processor platforms comprising a processor and at least one disk drive;
   each of said at least one disk platforms comprising:
      an interface for communicating with at least two processor platforms; and
      two disk drives;
      each of said processor platforms for communicating information for updating its own disk drives to at least one of said disk platforms for storage in both disk drives of said at least one disk platform;

said at least one disk platform for storing all disk information for all active processes;

said disk platform for providing information in a case of a processor platform failure to other processor platforms for processes that the other processor platforms take over from the failed processor platform;

wherein said disk platform further provides to a processor platform whose disk drives have failed, information to substitute for information stored in said failed disk drives.

2. The apparatus of claim 1, wherein said disk platform has a power supply unit separate from power supply units for said processor platforms.

3. The apparatus of claim 1, wherein ones of said processor platforms are connected to two disk platforms.

4. The apparatus of claim 1, wherein data is obtained transparently by a processor from its own disk or a disk platform.

5. The apparatus of claim 1, wherein said interface is a RAID (Redundant Array of Inexpensive Disks) Controller.

6. A multi-processor system comprising:

at least three processor platforms; and at least one disk platform;

each of said processor platforms comprising a processor and at least one disk drive;

each of said at least one disk platforms comprising:

an interface for communicating with at least two processor platforms; and two disk drives;

each of said processor platforms for communicating information for updating its own disk drives to at least one of said disk platforms for storage in both disk drives of said at least one disk platform;

said at least one disk platform for storing all disk information for all active processes;

said disk platform for providing information in a case of a processor platform failure to other processor platforms for processes that the other processor platforms take over from the failed processor platform;

wherein ones of said processor platforms are connected to two disk platforms.

7. The apparatus of claim 6, wherein said disk platform further provides to a processor platform whose disk drives have failed, information to substitute for information stored in said failed disk drives.

8. The apparatus of claim 6, wherein said disk platform has a power supply unit separate from power supply units for said processor platforms.

9. The apparatus of claim 6, wherein data is obtained transparently by a processor from its own disk or a disk platform.

10. The apparatus of claim 6, wherein said interface is a RAID (Redundant Array of Inexpensive Disks) Controller.

* * * * *